United States Patent [19]

Asada et al.

[11] Patent Number: 4,884,207

[45] Date of Patent: Nov. 28, 1989

[54] START CONTROLLER FOR ENGINE

[75] Inventors: Toru Asada, Takaoka; Kenichi Komuro, Toyota; Ryoichi Fukumoto, Nagoya; Nozomu Torii, Hekinan, all of Japan

[73] Assignee: Aisin Seiki Kabushiki Kaisha, Japan

[21] Appl. No.: 847,344

[22] Filed: Apr. 2, 1986

[30] Foreign Application Priority Data

Apr. 2, 1985 [JP] Japan .................................. 60-69821

[51] Int. Cl.⁴ .............................................. B60R 25/00
[52] U.S. Cl. ........................... 364/431.03; 123/198 B; 123/198 DB; 123/146.5 B; 307/10.4
[58] Field of Search ........ 123/198 B, 198 D, 198 DB, 123/146.5 B; 180/287; 340/63, 64; 307/10 AT; 70/252, 242, 243, 256; 364/431.03

[56] References Cited

U.S. PATENT DOCUMENTS

| | | | |
|---|---|---|---|
| 3,428,033 | 2/1969 | Watts | 123/146.5 A |
| 4,141,332 | 2/1979 | Wyler | 123/148 R |
| 4,366,466 | 12/1982 | Lutz | 180/287 |
| 4,517,831 | 5/1985 | Hirano | 123/198 DB |
| 4,596,303 | 6/1986 | Tremblay | 180/287 |
| 4,682,062 | 7/1987 | Weinberger | 340/64 |

FOREIGN PATENT DOCUMENTS 2009310 6/1979 United Kingdom .

Primary Examiner—Parshotam S. Lall
Assistant Examiner—Ellis B. Ramirez
Attorney, Agent, or Firm—Sughrue, Mion, Zinn, Macpeak & Seas

[57] ABSTRACT

The present invention relates to a start controller for an engine of a vehicle comprising fuel supply means for supplying fuel to the engine at current flowing time, an electric driver for flowing a current to the fuel supply means, control means for holding a specific code, comparing an input code with the specific code to judge the coincidence and instructing to flow a current to the driver when both coincide; and means for inputting the code to the control means. Thus, the start controller can prevent the vehicle from being stolen.

1 Claim, 11 Drawing Sheets

ENABLE 1

ENABLE 2

START CONTROLLER FOR ENGINE

BACKGROUND OF THE INVENTION

The present invention relates to a start controller for an engine of a vehicle.

In a conventional vehicle, a switch contact of a key cylinder is connected to a power line from an automotive battery. The switch contact is mainly operated to turn ON/OFF of an ignition circuit, locked and operated by a key intrinsic for the cylinder, and inhibited to start an engine by a third party who has no such key.

Figure 8:
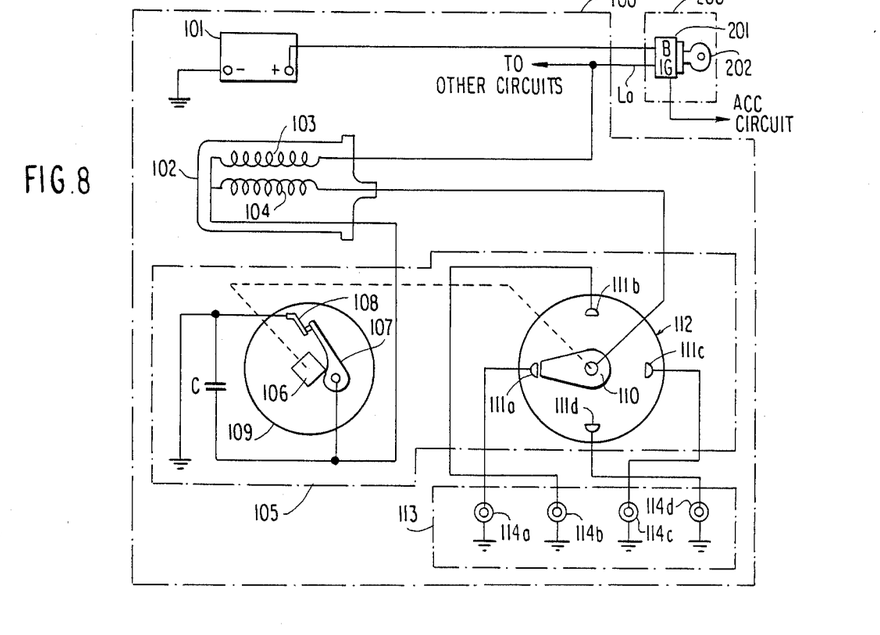
FIG. 8 is a block diagram showing a conventional ignition circuit.

FIG. 8 shows an electric circuit diagram of an example of an ignition circuit of a conventional vehicle. This ignition circuit is of a contact point type used for a 4-cylinder engine.

The ignition circuit will be described by referring to FIG. 8. Reference numeral 101 designates an automotive battery, 102 an ignition coil, 105 a distributor, 113 a cylinder head (in an engine), and 210 an ignition key cylinder. A section surrounded by two-dotted chain line 100 is disposed in an engine room, and a section surrounded by two-dotted chain line 200 is installed in a driver's cab.

The negative terminal of the battery 101 is connected to an automotive body (a body earth), and the positive terminal is connected to a power line La. The power line La supplies a positive voltage to the sections of the vehicle, and the switch contact of the ignition key cylinder 210 in the driver's cab is connected to the line La. In other words, the line La is branched to the terminal of the contact B of the cylinder 201 and the terminal of the contact IG.

The key cylinder 201 is a rotary switch, which becomes rotatably when the key 202 intrinsic for the cylinder is inserted. When the cylinder 201 is rotated, the contact B and the contact IG are closed to connect the power line (i.e., the engine switch is closed), and the power is supplied to a primary coil 103 and other circuits (e.g., a fail-cut valve).

The other end of the coil 103 is connected to the breaker arm 107 of the distributor 105. The distributor 105 has a rotary head 112 including a rotor 110 and segments 111a to 111d, and a breaker plate including a cam 106, a breaker arm 107 and a point arm 108. The rotor 110 and the cam 106 are coupled to the same drive shaft (not shown), which is connected to the crankshaft of the engine to rotate as the engine rotates.

Reference character C designates a spark preventing capacitor of the contact point due to a chattering.

When the contact point composed of the contacts of the breaker arm 107 and the point arm 108 is closed, a primary current is flowed in a closed circuit consisting of the positive terminal of the battery 101, the ignition key cylinder 201 (contacts B to IC), the primary coil 103, the breaker arm 107, the point arm 108 and the body earth when the engine switch is ON (the ignition circuit is closed), and the primary coil generates a magnetic flux. When the arm 107 is lifted by the rotation of the cam 106 to open the contact point in this state, the primary current is interrupted to abruptly reduce the magnetic flux generated in the coil 103. Since the primary coil 103 and the secondary coil 104 are magnetically coupled, the secondary coil 104 induces a high voltage due to the abrupt change of the magnetic flux. The high voltage induced in the secondary coil 104 is applied to the rotor 110, which distributes the high voltage to the segments 11a to 11d at a predetermined timing. The spark plugs 114a to 114d of the cylinder head 113 are respectively connected to the segments 111a to 111d thereby to generate spark discharge when the high voltage is applied.

More specifically, in the vehicle of this type, the start of the engine is controlled by the ON/OFF of the power line, the engine is locked in the state that the primary current (in the primary coil) of the ignition coil is interrupted to prevent the spark voltage from generating (in the secondary coil), thereby inhibiting the start of the engine.

In the conventional vehicle of this type, the ON/OFF contact of the power line for controlling the start of the engine is provided only in the ignition key cylinder. However, the power line connected to the key cylinder is connected to the terminal of the contact B and the terminal of the contact IG on the back of the ignition key cylinder (at opposite side of an key plug-in opening), and can be readily led out. Thus, even if there is no key intrinsic for the vehicle, when the cord is removed and connected, the power line can be connected to apply the voltage of the automotive battery to the ignition circuit and the other circuits equivalent to the closed engine switch.

Therefore, the engine is heretofore started by connecting the ignition circuit to the battery by a third party who have no key intrinsic for the vehicle, and the vehicle might be thus stolen.

SUMMARY OF THE INVENTION

It is, therefore, an object of the present invention to prevent a vehicle from being stolen.

In order to achieve the above object of the present invention, there is provided a start controller for an engine of a vehicle comprising fuel supply means for supplying fuel to the engine at current flowing time; an electric driver for flowing a current to the fuel supply means; control means for holding a specific code, comparing an input code with the specific code to judge the coincidence and instructing to flow a current to the driver when both coincide; and means for inputting the code by the control means.

According to the present invention, since fuel is not supplied to the engine if the specific code is not input, the start controller can prevent the vehicle from being stolen due to the shortcircuit of the conventional power line.

The above and other objects, features and advantages of the present invention will become apparent from the following detailed description of a preferred embodiment when taken in conjunction with the accompanying drawings.

BRIEF DESCRIPTION OF THE DRAWINGS

FIG. 6b is a timing chart showing the operation of the key code oscillator in FIG. 6a;

FIG. 6c is a block diagram showing the schematic construction of the key code receiver as a pair of the key code oscillator shown in FIG. 6a;

DESCRIPTION OF THE PREFERRED EMBODIMENTS

Figure 1A:
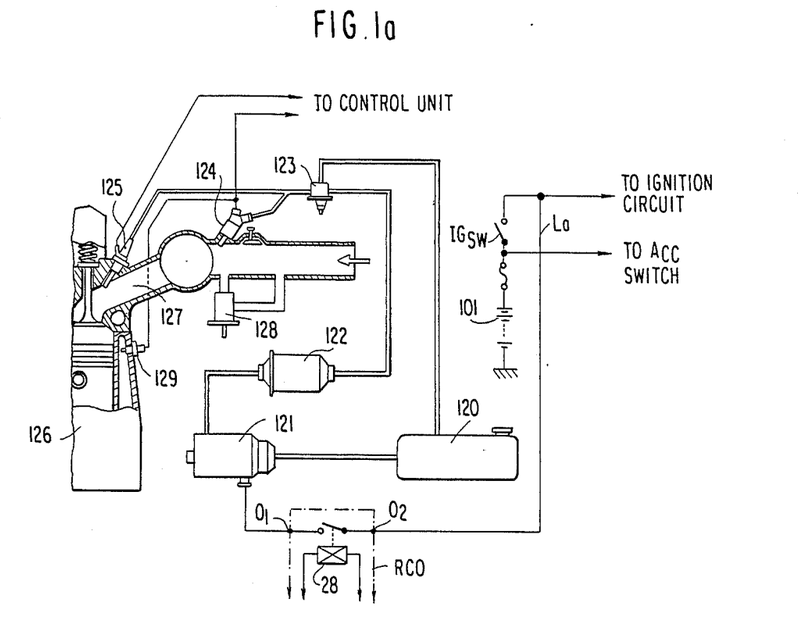
FIGS. 1a and 1b are block diagrams showing the schematic configuration of an embodiment of a start controller for an engine according to the present invention.

FIG. 1a shows a partial enlarged sectional view of an embodiment of a start controller for an engine according to the present invention. In this embodiment, a variable venturi type carburetor is employed. This carburetor has a high speed system which operates when the engine operates at a high speed and a low speed system which operates when the engine operates at a low speed. The embodiment will be described with reference to FIG. 1a.

Reference numeral 1 designates a low speed system of the carburetor. Numeral 2 designates a fuel cut valve. A force for closing a valve opening 2c formed in a valve body 2b is always applied by a spring (not shown) to the needle valve 2a of the fuel cut valve 2, and the valve 2a is magnetically attracted to open the valve opening 2c when energized. Fuel is fed from a float chamber (not shown) through the valve opening 2c and a fuel supply opening 2d formed in the valve body 2b to a bypass port 4 and an idle port 5.

The carburetor 1 is coupled to the intake manifold of the engine in the lower portion of FIG. 1a, and air is flowed in the direction of an imaginary arrow in FIG. 1a.

The bypass port is an extremely small opening perforated in the venturi wall. When a throttle valve 3 is closed except a small gap, fuel is intaken by the pressure drop due to the air flow passing the gap and the intake vacuum. Numeral 6 designates an idling adjusting screw, and numerals 7a and 7b designate air bleeds.

A relay controller RCO opens/closes the power line La of the fuel cut valve 2 upon receiving of an instruction of a microcomputer (MPU10).

Figure 2:
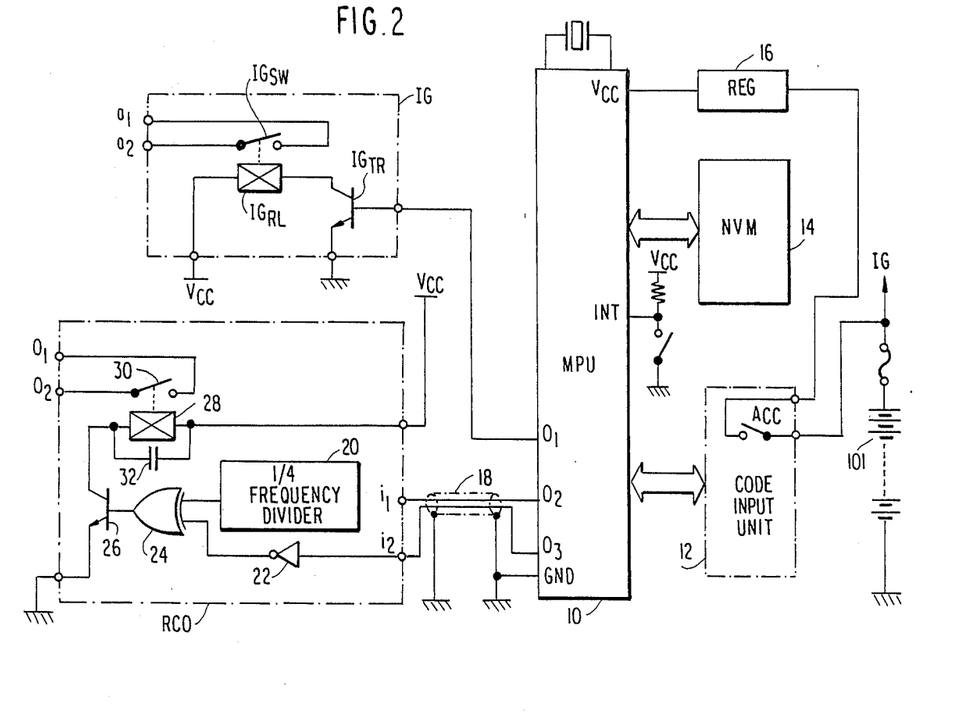
FIG. 2 is a block diagram showing the construction of a relay controller RCO shown in FIGS. 1a and 1b and its control system.

FIG. 2 shows the schematic construction of a control circuit of the relay controller RCO.

The control circuit mainly has the microcomputer (MPU) 10, which has input/output ports, to which a code input unit 12, a nonvolatile memory (NVM) 14, an ignition switch unit IG and the relay controller RCO to be described in detail later are connected. When the Acc switch in the input unit 12 is closed, a constant voltage Vcc is supplied from the battery 10 through a constant-voltage circuit (Reg) 16 to the MPU 10.

The NVM 14 is a read/write nonvolatile memory cell, which can retain the stored content even if the power is turned OFF to store specific code (hereinafter referred to as "a registration code"). To the interrupt input port Int of the MPU 10 is connected a changeover switch SW for updating the registration code stored in the NVM 14. The switch SW is installed in a glove box and normally turned OFF.

The ignition switch unit IG has a relay driver $IG_{TR}$, an ignition relay $IG_{RL}$ and its relay contact $IG_{SW}$. When the output port O1 of the MPU 10 becomes H level, the relay $IG_{RL}$ is energized to close the contact $IG_{SW}$. The relay contact (hereinafter referred to as "an ignition switch") $IG_{SW}$ of the ignition switch unit IG corresponds to the switch contact of the abovementioned ignition key cylinder 201, and the power line La is branched to the terminals $a_1$ and $a_2$ (corresponding to the terminals of the abovementioned contacts B and IG).

The relay controller RCO has a ⅓ frequency divider 20, an inverter 22, an exclusive OR gate 24, a relay driver 26 and a fuel cut relay 28. Enable 1 signal and Enable 2 signal are respectively fed to the input terminals $i_1$ and $i_2$ of the controller RCO through a shielded cable 18 from output ports O2 and O3 of the MPU 10 under predetermined conditions.

Figure 3:
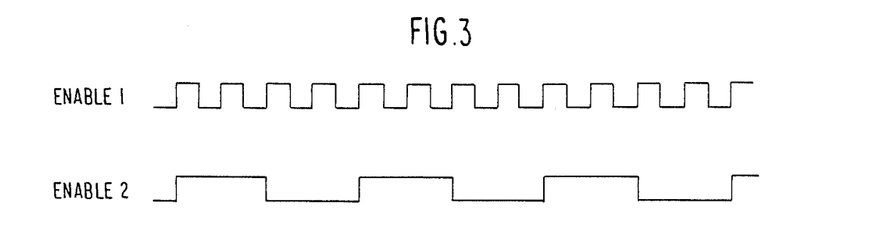
FIG. 3 is a timing chart showing an enable 1 signal and an enable 2 signal.

The enable 1 signal and the enable 2 signal are shown in FIG. 3. The enable signal 2 becomes a pulse having ⅓ period of the enable 1 signal. The frequency divider 20 is triggered at the ride of the enable 1 signal to divide by 3 the frequency of the enable 1 signal and outputs the same pulse train as the enable 2 signal. This output is applied to one input of the exclusive OR gate 24. The enable 2 signal inverted by the inverter 22 is applied to the other input of the gate 24, and the gate 24 outputs H level upon inputting. The output terminal of the gate 24 is connected to the base of a switching transistor (relay driver) 26, which is turned ON by the H level output of the gate 24 thereby energizing the relay 28 to close the relay contact 30. The power line La is connected to the terminals $o_1$ of the relay contact 20, and the fuel cut valve 2 is connected to the terminal $o_2$. Thus, the valve 2 is energized to open the valve opening 2c, thereby supplying fuel.

The fuel cut relay 28 is a delay relay connected in parallel with a capacitor 32 to delay so that the contact 30 does not break when the driver 26 is instantaneously cut off due to a noise or the like.

Since the input signal of the controller RCO is not simple H level or L level signal, the fuel cut relay 26 is not energized even if a signal line is connected to the H level terminal (e.g., Vcc) or the L level terminal (e.g., a body earth).

Figure 1B:
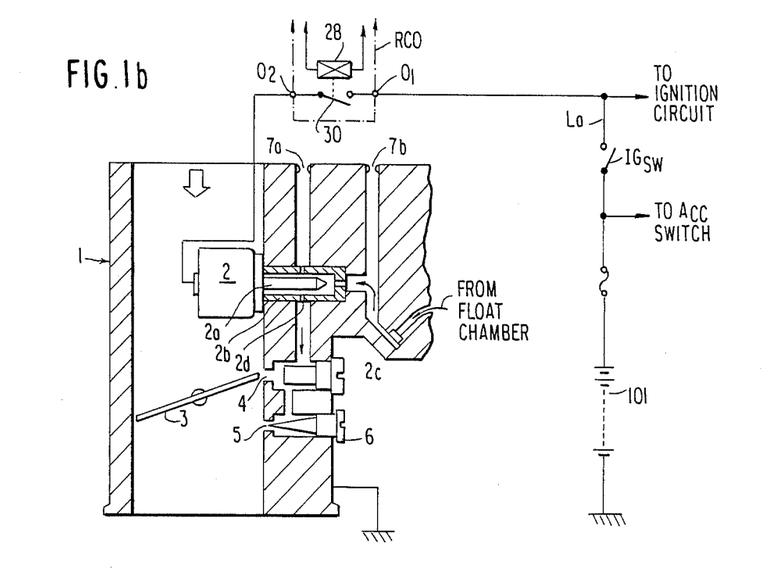

In a fuel injection type fuel device (fuel injection device) using an electric fuel pump, the relay controller RCO may be connected to the power line of the fuel pump. An example of this arrangement is shown in FIG. 1b. In FIG. 1b, fuel in a fuel tank 120 is flowed under pressure by a fuel pump 121 in a direction as indicated by arrows in FIG. 1b. Reference numeral 122 designates a fuel filter element, and 123 a pressure regulator. The fuel overflowed from the regulator 123 is returned through a return passage to the tank 120.

The fuel supplied by the pump 121 is injected from the injection nozzles of an electromagnetic start valve 124 and an injection valve 125 into the intake manifold 127 of an engine 126. The valves 124 and 125 are controlled by a control unit (not shown) of the fuel injection device. Reference numeral 128 designates an auxiliary air valve, and 129 a coolant water temperature sensor of the engine 126.

The pump 121 is an electric rotary pump having a drive motor therein, and the controller RCO is connected to the power line. In this case, the power line of the pump side is connected to the terminal $o_1$ of the controller RCO, and the power line of the battery side is connected to the terminal $o_2$. Accordingly, if predetermined conditions are not input, the relay contact of the controller RCO remains open, and even if the $IG_{SW}$ is shorted, the power line La of the pump 121 is not connected. Thus, fuel is not supplied to the engine 126.

In a fuel injection device using a mechanical fuel pump, a relay controller RCO may be connected to the power line of an electromagnetic start valve 124 and/or an injection valve 125. In this case, the injection nozzles of the valves 124 and/or 125 are closed except when predetermined conditions are input, and fuel is not supplied to the engine 126.

The MPU 10 receives a code input from the code input unit 12, and when the code coincides with the registration code stored in the NVM 14, the MPU 10 supplies the enable 1 signal and the enable 2 signal representing a fuel supply to the controller RCO.

Then, the code input unit 12 will be described.

Figure 4:
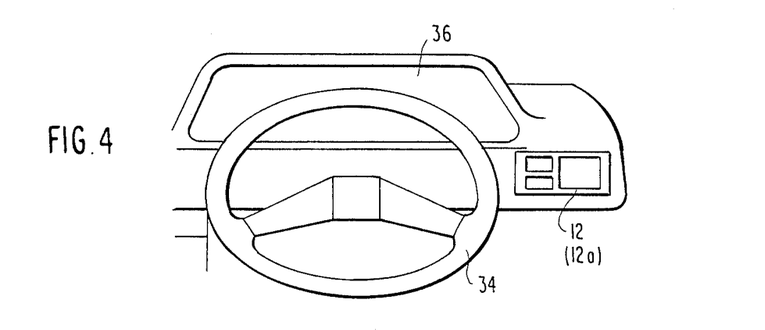
FIG. 4 is a front view showing partial external appearance of an instrument panel of the vehicle.

FIG. 4 shows the partial external appearance of the instrument panel of the vehicle. In FIG. 4, reference numeral 34 designates a steering wheel, and 36 an instrument cluster. The code input unit 12 is installed in the lower right portion of the cluster 36.

Figure 5A:
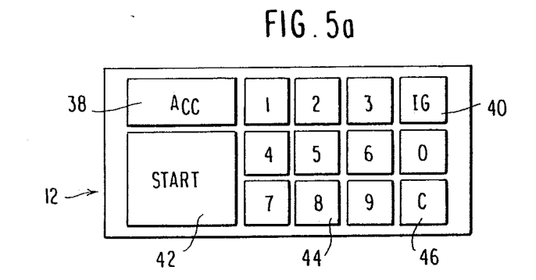
FIG. 5a is a front view showing the external appearance of a code input unit having ten keys.

FIG. 5a shows an example of the code input unit 12 of keyboard type mainly containing ten keys. In FIG. 5a, reference numeral 38 designates an Acc switch, 40 an IG key, 42 a start switch, 44 ten keys, and 46 a clear key. The Acc switch 38 is an alternative switch which repeats ON/OFF whenever depressed once. The start switch 42 is a back light projection type return switch, which lights when an IG mode is set and a starter (not shown) is energized while being depressed.

Figure 9A:
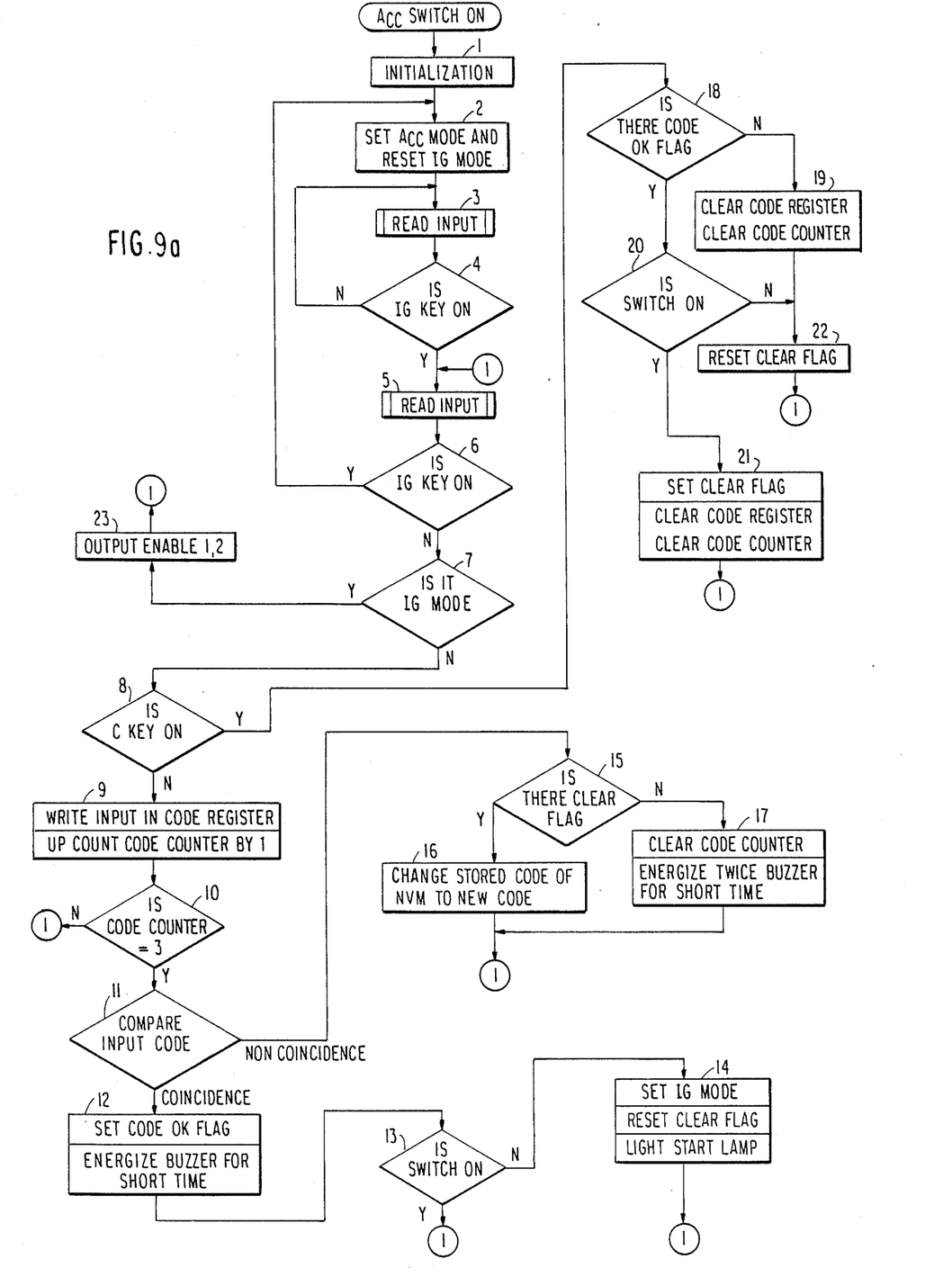
FIG. 9a is a block diagram showing the operation of a microcomputer 10 in FIG. 2 by ten key input.

The schematic operation of the MPU 10 in case that the code input unit 12 is of the abovementioned keyboard type is shown in the flow chart of FIG. 9a. The operation will be described with reference to FIG. 9a.

A driver first turns ON the ACC switch to set an Acc mode (accessory mode), then depresses the IG key 40, and inputs 3 digit registration code so as to set an IG mode. In the IG mode, the ignition circuit is closed to supply fuel to the engine. When the switch 42 is closed to energize the starter, the engine is started. In the IG mode, when the IG key is further operated, the Acc mode is reset (the engine s stopped).

In step S1 (first step), when the Acc switch 38 is closed, the constant voltage Vcc is applied from the constant-voltage circuit 16 to initialize a RAM, a register and an output port, etc.

In steps S2 to S4, the Acc mode is set, and the IG mode is reset to monitor the input of the IG key 40.

In step S4 to S10, when the ten keys 44 are operated after the IG key 40 is operated, an input value is written in the code register. Since the registration code as 3 digits, it reads out the input until a code counter becomes 3.

In steps S8, S18 and S19, when the clear key 46 is operated while the code is input (second digit and later), the code counter and the code register are cleared. Thus, the driver must correct the input.

In step S10 to S14, the 3-digit code is input, and when the code coincides with the registration code stored in the NVM 14, the NVM 14 sets a code OK flag to energize once a buzzer (not shown) for a short time thereby to notify the reception of the code. Then, if the switch SW is not ON, it energized the ignition relay $IG_{RL}$ thereby to set the IG mode, and turns ON a start lamp for lighting the start switch 42.

In steps S11, S15 and S17, when the input code does not coincide with the stored registration code, the NVM 14 energizes twice the buzzer for a short time to notify an input error.

In steps S5 to S7, and S23, in the IG mode, the abovementioned enable 1 signal and the enable 2 signal are output to the controller RCO. In the IG mode, when the IG key is operated, the Acc mode is reset.

In step S13, when the registered registration code is changed, the switch SW is closed to input the registration code.

In steps S5 to S8, S18, S20 and S21, if the clear key is operated when the code OK flag is produced, a clear flat is set to clear the code register and the code counter.

In steps S5 to S11, S15 and S16, 3-digit code (new code) to be altered is input. Since the new code is not yet stored in the NVM 14, the NVM 14 becomes noncoincident, but since there is the clear flag, the NVM 14 changes the stored content to the input new code.

In step S20, the change of the NVM 14 is enabled. More specifically, there is the code OK flag, and if the switch SW is again turned OFF even if the clear key is operated, the clear flag is rest to stop the change of the stored code.

The code input unit 12 in FIG. 2 may be alternatively composed of a key code oscillator for generating a signal including code information and a key code receiver for detecting the code information contained in the signal upon receiving of the signal generated from the key code oscillator. In this case, the key code receiver is mounted in the vehicle, and the driver carries the key code oscillator.

Figure 6A:
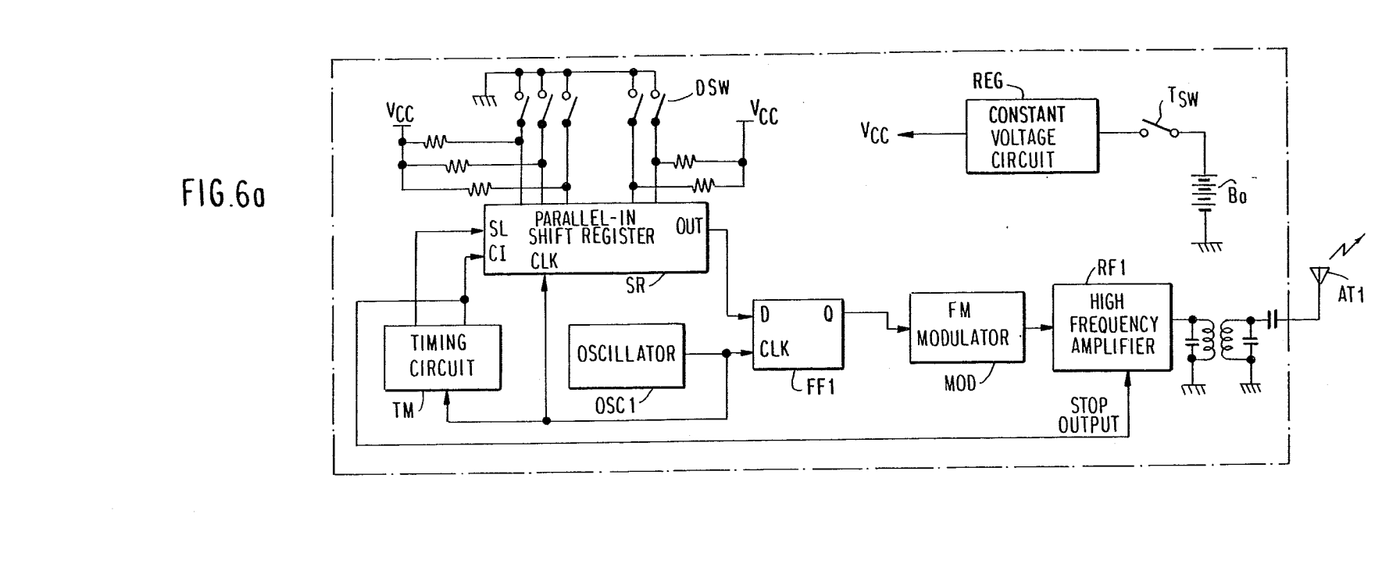
FIG. 6a is a block diagram showing the schematic construction of a key code oscillator.

FIG. 6a shows an example of schematic arrangement of the key code oscillator. The key code oscillator will be described with reference to FIG. 6a. Reference character SR designates a 16-bit shift register, which has 16 parallel input terminals, a clock pulse input terminal CLK, a shift/load input terminal SL, a clock inhibit input terminal CI, a serial output OUT, etc. A pull-up resistor and DIP (dual in-line package) type switch DSW are connected to the parallel input terminals. The other end of the switch DSW is grounded. A signal from a timing circuit TM is applied to the input terminals SL and CI of the shift register SR. A signal from the oscillator OSC1 is applied to the input terminal of the timing circuit, a D-type flip-flop FF1 and the clock input terminal of the shift register SR. The output terminal OUT of the shift register SR is connected to the input terminal D of the flip-flop FF1, and the output terminal O of the FF1 is connected to a FM modulator MOD. The output terminal of the MOD is connected to a high frequency amplifier RF1, and the output of the amplifier RF1 is connected through a tuning circuit to a transmission antenna AT1. A radio wave oscillation/stop control input terminal for reducing the power consumption of the key code oscillator is provided in the amplifier RF1, and the output terminal of the timing circuit TM is connected to the input terminal.

Figure 6B:
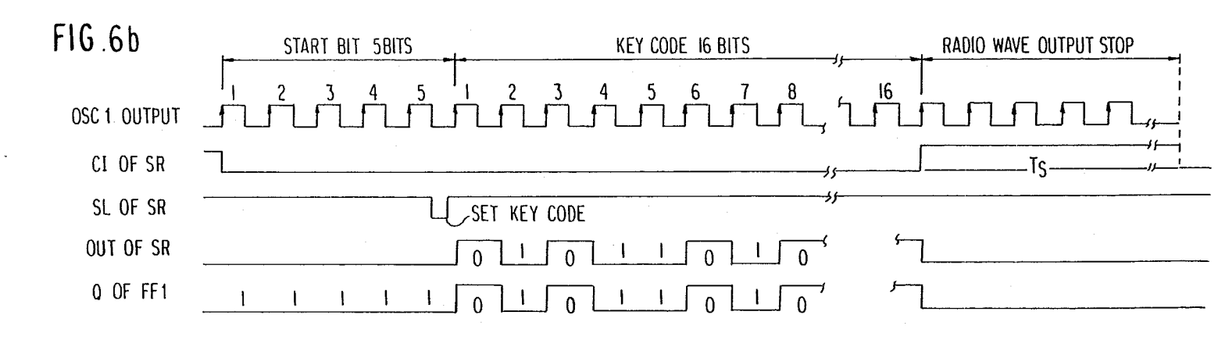

FIG. 6b shows the operating timing of the key code oscillator in FIG. 6a. The timing will be described with reference to FIGS. 6a and 6b. In this case, the code (binary number) stored in the NVM 13 is set in the switch DSW. When the power switch $T_{SW}$ is closed, the constant voltage Vcc is applied form the battery Ba through the constant-voltage circuit REG to the respective sections.

When the clock inhibit input terminal CI of the shift register SR becomes L (low level), a radio wave output is started, and the data shifting of the SR is also started. Since the key code data applied to the parallel input terminals are not read out at this time, data "1" is output to the output terminal OUT of the SR. This operation continues for a 5-clock period. In other words, start bit data of data "11111" is output. When the 5-block period is finished, the shift/load input terminal SL outputs L for a short time, thereby presetting a predetermined key code data set to the parallel input terminals to the bits of the shift register SR.

Then, 16-bit key code data set synchronously with the clock is serially output. When the key code data are completely output, the start bits are again output to start the second output of the key code data. After this operation is repeated several times, the clock inhibit CI is set to H (high level) to stop the output of the radio wave only during the period Ts. Thereafter, this operation is repeated in the same period until the power switch $T_{SW}$ is turned OFF.

The flip-flop FF1 sets the data from the shift register SR to the output terminal at the rise of the clock pulse. The output signal of the FF1 is frequency-modulated by the MOD, amplified by the amplifier RF1, and radiated as a radio wave from the antenna AT1.

Figure 6C:
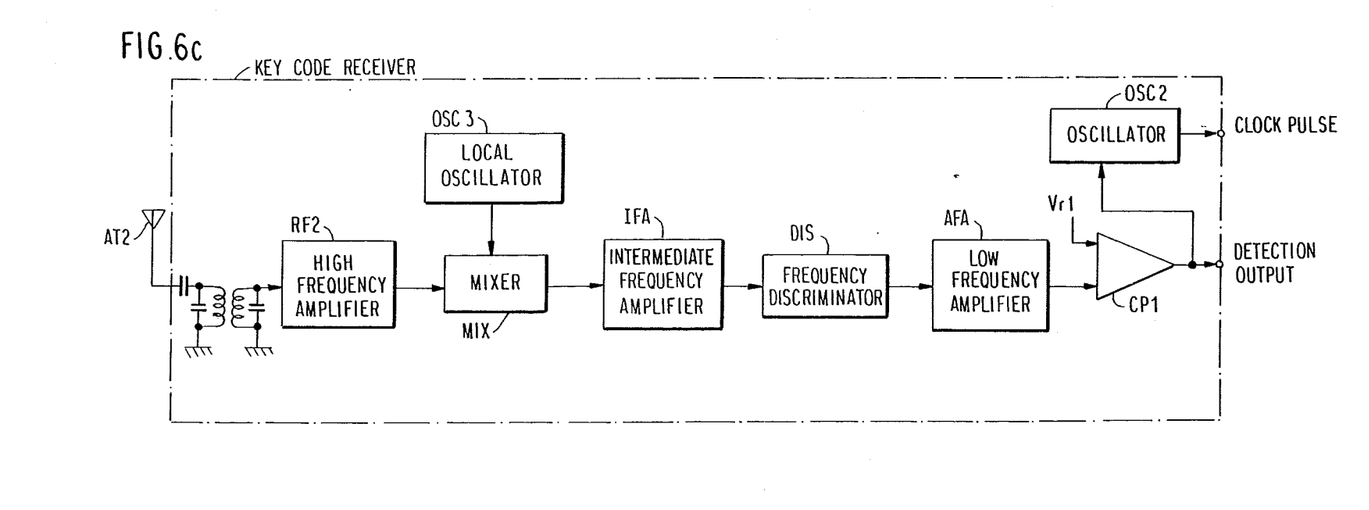

FIG. 6c shows an example of schematic arrangement of the key code receiver installed in the vehicle. The key code receiver will be described with reference to FIG. 6c. In this example, the key code oscillator has an oscillator OSC2, a local oscillator OSC3, a high frequency amplifier RF2, a mixer MIX, an intermediate frequency amplifier IFA, a frequency discriminator DIS, a low frequency amplifier AFA, a comparator CP1, etc. A reception antenna AT2 is connected through a tuning circuit to the input terminal of the amplifier RF2. The radio wave from the key code oscillator is amplified, when received, by the amplifier RF2, mixed with the oscillation frequency from the oscillator OSC3 in the mixer MIX, and converted into an intermediate frequency. Then, the radio wave is amplified by the amplifier IFA, and demodulated by the discriminator DIS. The demodulated signal is amplified by the amplifier AFA, and converted (waveform-shaped) by the comparator CP1 into a binary signal responsive to the signal level. The oscillator OSC2 outputs a clock pulse of the same frequency as the key code oscillator OSC1 synchronized with the detection output.

Figure 5B:
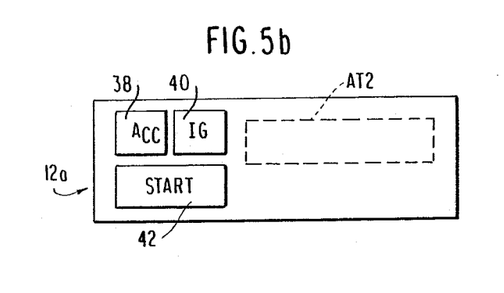
FIG. 5b is a front view showing the external appearance of a vehicle side code input unit having a key code receiver.

The key code receiver is associated in a code input panel 12a, and installed in the position (12a) in FIG. 4. The external appearance of the panel 12a is shown in FIG. 5b. In FIG. 5b, the Acc switch 38, the IG key 40 and the start switch 42 are constructed in the same manner as those described above.

The antenna AT2 is a ferrite bar antenna installed on the back of the panel to receive a radio wave through the panel 12a. The antenna AT2 is connected to the tuning circuit in FIG. 6c.

Figure 9B:
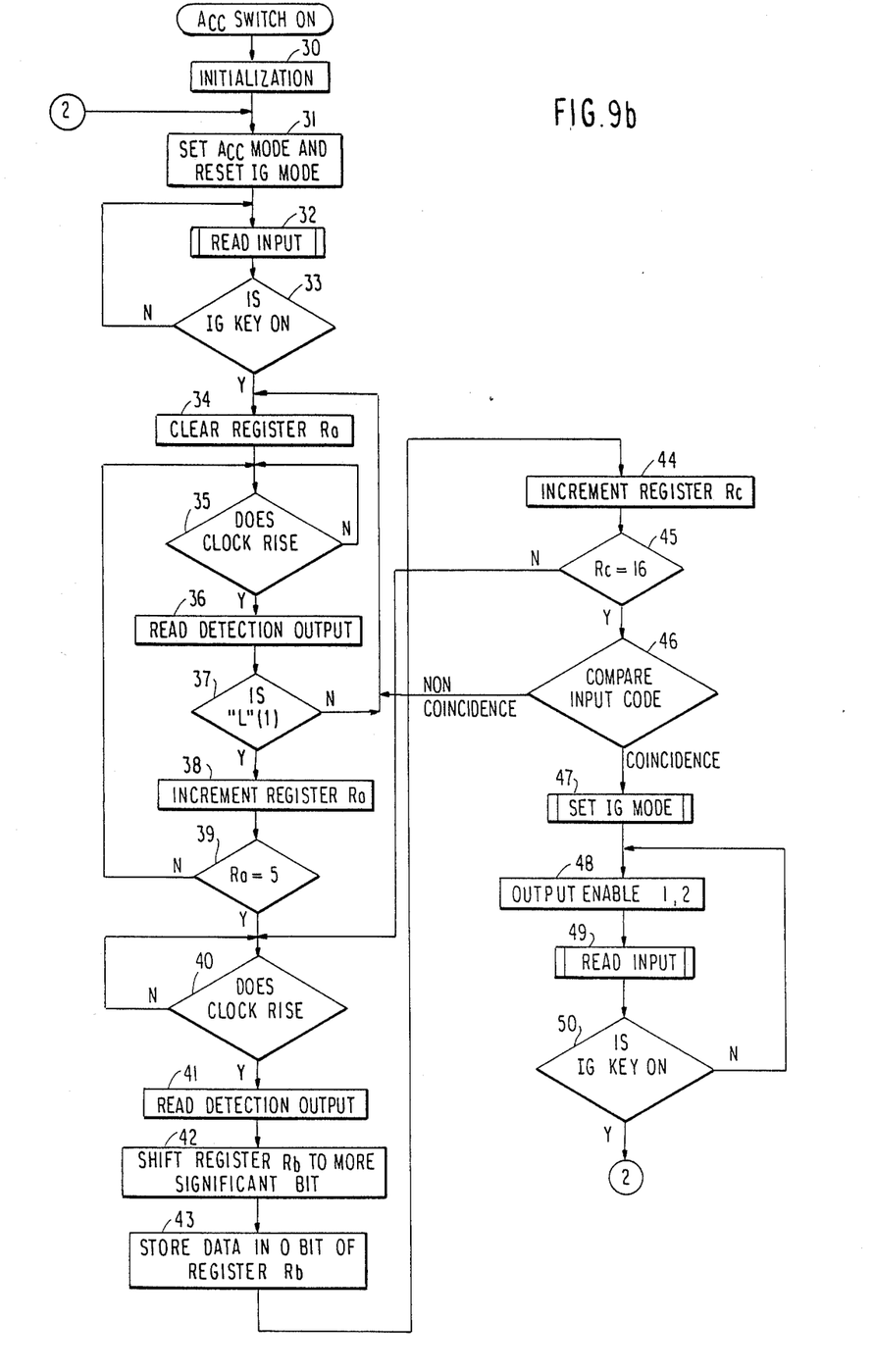
FIG. 9b is a block diagram showing the operation of a microcomputer 10 of FIG. 3 by radio wave reception including key code information.

The operation of the MPU 10 will be described with reference to the flow chart of FIG. 9b with respect to the code input.

The driver first set the Acc switch ON to set the Acc mode (accessory mode), depresses the IG key 40, then closes the power switch $T_{SW}$ of the key code oscillator to generate registration code data, and sets the IG mode. Since the power switch $T_{SW}$ of the key code oscillator is of return switch type, it stops oscillating when driver's finger is released from the switch $T_{SW}$. In the IG mode, the ignition circuit is closed. When the start switch 42 is closed, the starter is energized to rotate the engine. In the IG mode, when the IG key 40 is further operated, the Acc mode is reset (the engine is stopped.)

In step S30 to S33, when the Acc switch 38 is turned ON, the constant voltage Vcc is applied from the constant-voltage circuit 16 to initialize a ROM, a register, an output port, etc. Then, the Acc mode is set, the IG mode is reset to monitor the input of the IG key 40.

In step S33 to S39, when the IG key 40 is operated, the reading of the received input (detection output) is started. Since the key code data output from the key code oscillator contains 5-bit start bits, the start bits are first detected. Thus, the level of the detection output signal is read out synchronously with the rise of the clock pulse generated from the oscillator OSC2. When the output signal becomes L level, the content of the register Ra is incremented. If H level is input before detecting continuously five times L level signals, the register Ra is cleared to again detect the start bits from the initial.

In steps S39 to S45, when the start bits are detected, the 16-bit key code detection is executed. Similarly in this case, the detection output level is read out synchronously with the rise of the clock pulse. In this case, the content of the register Rb (16 bits) is sequentially shifted by one bit toward the more significant bit, the content (I/O) of the data bit read out at the least significant bit is stored, and this operation is repeated until all the 16-bit key code is read out. The 16-bit counting is executed by the register Rc.

In step S46, if the read key code does not coincide with the registration code stored in the NVM 14, the key code oscillator again returns to the step S34 to start the detection of the start bits since the oscillation is repeated while the power switch is ON.

In step S47, when the read key code coincides with the registration code stored in the NVM 14, the ignition relay $IG_{RL}$ is energized to light the start switch 42, thereby setting the IG mode.

In steps S48 to S50, in the IG mode, the enable 1 and 2 signals are output. In the IG mode, when the IG key 40 is operated, the Acc mode is reset.

The code input unit in FIG. 2 may be composed of a key card for storing code information and a key card reader for reading code information stored in the key card when the key card for storing code information is inserted. In this case, the key card reader is installed in the vehicle, and the driver carries the key card.

Figure 5C:
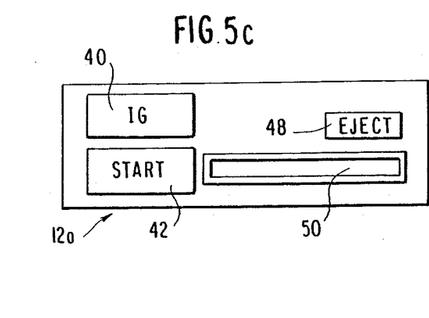
FIG. 5c is a front view showing the external appearance of a vehicle side code input unit having a key card reader.

FIG. 5c shows the external appearance of the code input panel 12a of the case having the key card reader. In FIG. 5c, the IG key 40 and the start switch 42 operate in the same manner as those described above. Reference numeral 50 designates a plug-in port of the key card, and 48 an ejection key (EJC key) for pointing out the removal of the key card.

Figure 7A:
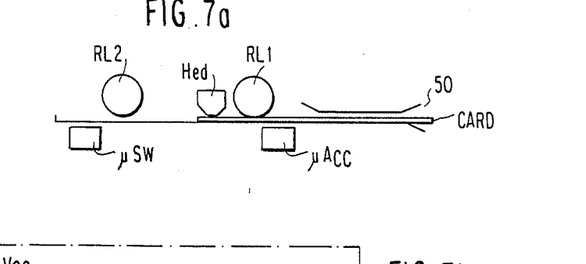
FIG. 7a is a cross sectional view of a key card reader having a code input unit of FIG. 5c.
Figure 7B:
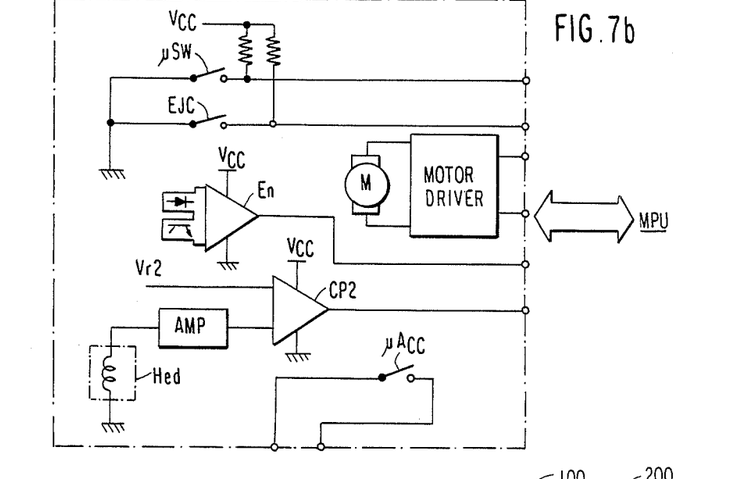
FIG. 7b is a block diagram showing the schematic configuration of the key card reader.

The schematic sectional view of the key card reader of the state that the key card is inserted is shown in FIG. 7a, and the schematic electric circuit of the key card reader is shown in FIG. 7b. The key card and the key card reader will be described with reference to FIGS. 7a and 7b.

The key card reader is of a magnetic reader, and a magnetic tape is bonded to a predetermined position of the key card.

The key card reader has rollers RL1 and RL2 for conveying the key card, a magnetic head Hed for reading the code, and microswitches $\mu$Acc and $\mu$Sw. The rollers RL1 and RL2 are rotatably driven by a motor M. The rotation of the motor M is detected by a rotary encoder En to generate a timing pulse.

When the key card is inserted and the microswitch Acc is closed, the motor M is rotated normally (feeding the card) to input the key card by the rotation of the roller RL1. Since the key card is conveyed at a predetermined speed, the head Hed can read out information on the key card as a variation in the voltage responsive to the variation in the magnetic flux. The variation of the voltage is amplified by an amplifier AMP, and converted (waveform-shaped) by a comparator CP2 into a binary signal responsive to the signal level. When the key card is further fed and the microswitch $\mu$Sw is closed, the motor M is stopped.

Figure 9C:
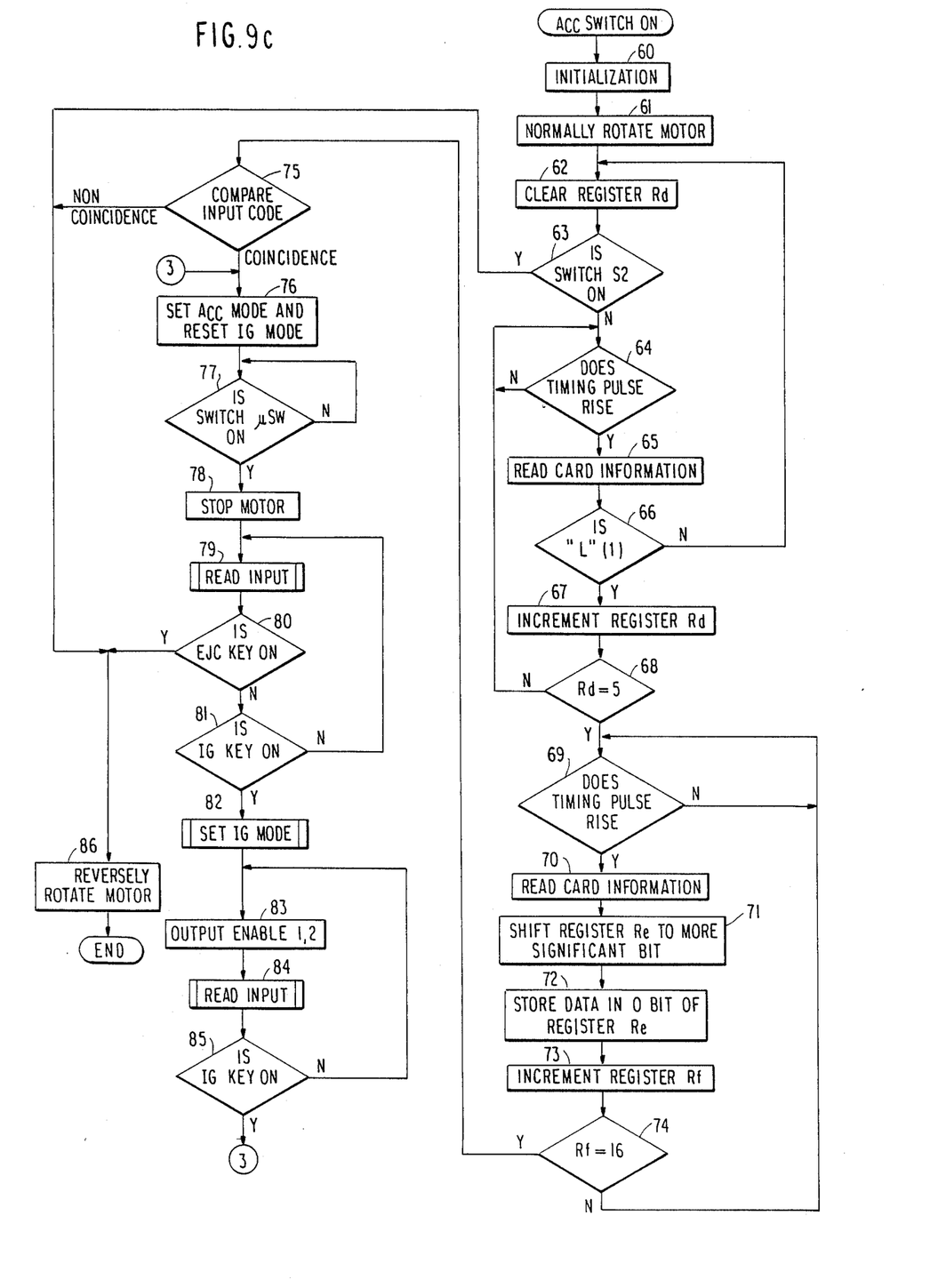
FIG. 9c is a block diagram showing the operation of a microcomputer 10 of FIG. 2 by a key card input.

Then, the code input by the key card and the key card reader will be described with reference to the flow chart of FIG. 9c. The key card magnetically stores 5-bit start bits and 16-bit key code in the same manner as the key code oscillator described above.

The driver first inserts the key card from the plug-in port 50. When the key card is received in the key card reader, the Acc mode (accessory mode) is set, and when the IG key 40 is then depressed, the IG mode is set. When the key card is not received, the key card is exhausted from the port 50. In the IG mode, the ignition circuit is closed. Then, when the start switch 42 is closed, the starter is energized to rotate the engine. In the IG mode, when the IG key is further operated, the Acc mode is reset (stopping the engine). When the ejection (EJC) key 48 is operated in the Acc mode, the key card is exhausted from the port 50. When the key card is removed, the microswitch Acc is turned OFF, and the Acc mode is released.

In steps S60 and S61, when the key card is inserted, the Acc switch (microswitch $\mu$Acc) is turned ON, the constant voltage Vcc is applied from the constant-voltage circuit 16 to initialize a ROM, a register, an output port, etc. Then, the motor M is normally rotated to feed the key card inside.

In steps S62 to S68, the reading of the key code data written on the key card is started in parallel with the feeding of the card. In this reading, 5-bit start bits are first detected. Thus, the level of the read output signal (the output of CP2) is read synchronously with the rise of the timing pulse generated from the rotary encode En, and the content of the register Rd is incremented when becoming L level. If H is input while detecting the start bits, the register Rd is cleared to again detect the start bits from the first, but since the key card is not recognized to be normal if the microswitch $\mu$Sw is closed before detecting L of the continuous 5 bits, the motor M is reversely rotated to exhaust the key card (in step S86).

In steps S68 to S74, when the detection of the start bits is finished, the detection of 16-bit key code is executed. Similarly in this case, the detection output level is read out synchronously with the rise of the timing pulse. In this case, the content of the register Re (16 bits) is sequentially shifted toward the more significant bits, and the content (I/O) of the data bit read out at the least significant bit is stored. This is counted by the register Rf, and the operation is repeated until all 16-bit key code is read out completely.

In steps S75 and S86, if the read key code does not coincide with the registration code stored in the NVM 14, the motor M is reversely rotated to exhaust the key card.

In step S76, when the read code coincides with the registration code stored in the NVM 14, the Acc mode is set.

In steps S77 and S78, the key card is fed until the microswitch $\mu$Sw is closed, and the motor is then stopped.

In steps S79 to S81, when the input is read and the RJC key is operated, the motor M is reversely rotated to exhaust the key card, and when the IG key 40 is operated, the ignition relay $IG_{RL}$ is energized to light the start switch 42, thereby setting the IG mode.

In step S82 to S85, in the IG mode, the enable 1, 2 signals are output. In the IG mode, when the IG key 40 is operated, the IG mode is released, and the Acc mode is reset.

The ignition switch $IG_{SW}$ (relay contact of the ignition relay $IG_{RL}$) of the embodiment described above may employ the conventional ignition key cylinder.

According to the present invention as described above, fuel is not supplied to the engine if the specific code is not input. Therefore, the invention can prevent the vehicle from being stolen due to the short of the power line (engine switch) in the conventional device.

What is claimed is:

1. A start controller for an engine of a vehicle comprising:
   fuel supply means for supplying fuel to the engine;
   electric driving means for supplying a current to the fuel supply means for operating the fuel supply means to supply fuel to the engine;
   control means for holding a specific code, comparing an input code with the specific code to judge the coincidence and energizing the electric driver means when the specific code and the input code coincide; and
   code input means for inputting the input code to the control means wherein said input means comprises a portable key code oscillator having means for generating a signal including code information and transmitting said signal and a vehicle mounted key code receiver having means for receiving the signal generated and transmitted by the key code oscillator means for detecting input code information included in the signal and providing said input code information to said control means.

* * * * *